No. 747,178. PATENTED DEC. 15, 1903.
S. R. HOWARD & W. HEWETT.
CAMERA SUPPORT.
APPLICATION FILED OCT. 21, 1902.
NO MODEL.

Witnesses:
M. F. Ellis
M. M. Hamilton

Inventors:
Stanley R. Howard
William Hewett
by their attorneys
Harding & Harding No. 747,178. Patented December 15, 1903.

UNITED STATES PATENT OFFICE.

STANLEY R. HOWARD AND WILLIAM HEWETT, OF PHILADELPHIA, PENNSYLVANIA.

CAMERA-SUPPORT.

SPECIFICATION forming part of Letters Patent No. 747,178, dated December 15, 1903.

Application filed October 21, 1902. Serial No. 128,132. (No model.)

*To all whom it may concern:*

Be it known that we, STANLEY R. HOWARD and WILLIAM HEWETT, citizens of the United States, residing at Philadelphia, in the county of Philadelphia and State of Pennsylvania, have invented certain new and useful Improvements in Camera-Supports, of which the following is a specification.

My invention relates to devices for securing tripods to cameras. It has for its object to provide means readily attachable to and detachable from Brownie or other cameras not provided with screw-holes to attach them to tripods, whereby such a camera can be readily secured to and removed from the tripod.

The invention consists of an attachment having a central portion provided with a screw-threaded orifice and two oppositely-extending hooking and clamping members constructed as hereinafter described.

Figure 1:
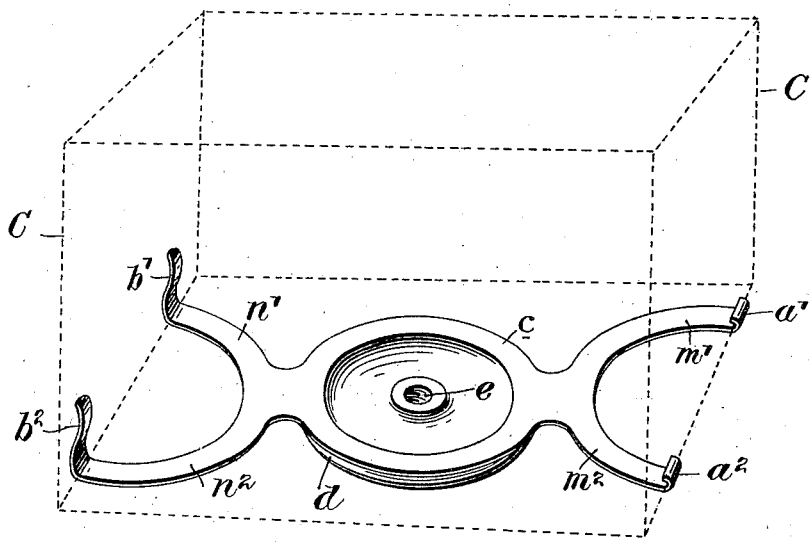
Figure 2:
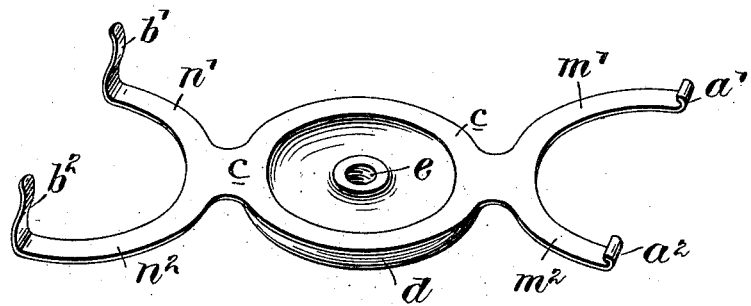

In the drawings, Figure 1 is a perspective view illustrating my attachment secured in position upon a camera. Fig. 2 is a perspective view of the attachment.

$c$ is the body of the attachment, made of thin sheet metal, the same consisting of an annular central portion and the arms $m'$ $m^2$ diverging therefrom on one side and the arms $n'$ $n^2$ diverging therefrom on the other side.

$d$ is a comparatively thick and rigid disk secured to the annular central portion of the body and hollowed out between its center and periphery. In the central portion of the disk a screw-threaded hole $e$ is provided. The ends of the arms $m'$ $m^2$ are bent upwardly into a hook shape to form catches $a'$ $a^2$, adapted to engage one of the lower edges of the box. The arms $n'$ $n^2$ are provided with integral upwardly-projecting clamps $b'$ $b^2$, bent inwardly between their ends.

The method of attaching the attachment to a camera is as follows: The attachment is placed under the camera C and the catches $a'$ $a^2$ caused to engage front of the box near its lower edge. The opposite end of the attachment is then forced upwardly, the outwardly-flaring ends of the clamps enabling them to override the opposite lower edge of the back of the camera and the elasticity of the clamps serving to hold the attachment firmly in place. The camera can now be attached to any tripod by means of the screw-hole $e$.

Having now fully described our invention, what we claim, and desire to protect by Letters Patent, is—

1. An attachment for cameras consisting of a central portion having a screw-threaded orifice and oppositely-extending end members provided respectively with a hooked end adapted to engage one end of the camera and an elastic clamp adapted to snap upon the other end of the camera, substantially as described.

2. An attachment for cameras consisting of a central portion having a screw-threaded orifice, two arms, diverging in one direction, bent to form catches adapted to engage one end of the camera, and two arms, diverging in the other direction, bent upwardly and adapted to snap upon the other end of the camera, substantially as described.

3. An attachment for cameras consisting of a body having an annular central portion provided with outwardly-diverging arms having catches adapted to engage one end of the camera and outwardly-diverging arms having clamps adapted to engage the other end of the camera, combined with a central piece held within the annular central portion of the body and having means whereby a tripod can be secured thereto, substantially as described.

4. An attachment for cameras, consisting of a body of thin sheet metal having an annular central portion provided with two arms diverging from each side thereof, combined with a central piece held within the annular central portion of the body, and having a screw-threaded orifice, the two arms on one side being bent at their extremities to form catches, and the two arms on the other side having integral clamps extending at substantially right angles to the arms and curved inwardly between their ends, substantially as described.

In testimony whereof we affix our signatures in presence of two witnesses.

STANLEY R. HOWARD.
WILLIAM HEWETT.

Witnesses:
GEO. M. BLITHE, Jr.,
THOS. W. WILKINSON.